United States Patent
Miranda Montalvo

(10) Patent No.: US 8,201,889 B2
(45) Date of Patent: Jun. 19, 2012

(54) ARMREST DEVICE

(76) Inventor: Migdoel Miranda Montalvo, Cedar Park, TX (US)

( * ) Notice: Subject to any disclaimer, the term of this patent is extended or adjusted under 35 U.S.C. 154(b) by 272 days.

(21) Appl. No.: 12/544,068

(22) Filed: Aug. 19, 2009

(65) Prior Publication Data

US 2011/0043026 A1    Feb. 24, 2011

(51) Int. Cl.
*B60N 2/46* (2006.01)
(52) U.S. Cl. .................. 297/411.2; 297/411.45
(58) Field of Classification Search ............ 297/411.2, 297/411.23, 411.45, 188.14; 244/122 R
See application file for complete search history.

(56) References Cited

U.S. PATENT DOCUMENTS

| | | | | |
|---|---|---|---|---|
| D369,706 S | * | 5/1996 | Olson | D6/501 |
| 5,597,207 A | * | 1/1997 | Bergsten et al. | 297/411.35 |
| 5,984,415 A | * | 11/1999 | Schumacher et al. | 297/411.2 |
| 6,827,405 B1 | * | 12/2004 | Roberts | 297/411.23 |
| 6,863,344 B2 | * | 3/2005 | Smallhorn | 297/217.3 |
| D543,061 S | * | 5/2007 | Shunjie | D6/501 |
| 7,448,682 B2 | * | 11/2008 | Rutty | 297/230.1 |
| 7,959,231 B2 | * | 6/2011 | Lee | 297/411.2 |
| 2005/0012376 A1 | * | 1/2005 | Siminovitch et al. | 297/411.35 |

* cited by examiner

*Primary Examiner* — David Dunn
*Assistant Examiner* — Erika Garrett

(57) ABSTRACT

An armrest accessory attached or integrally made with an armrest placed between seats in a row of chairs wherein said armrest accessory provides individual space for the arms of both persons sitting at either side of the device without increasing the width of the division. The armrest accessory comprises a resilient material with a curved cross-section that will extend throughout the length of the division of the seats. The curvature of the device creates two separate platforms, one above the other, which are used as armrests.

8 Claims, 7 Drawing Sheets

_US 8,201,889 B2_

ARMREST DEVICE

STATEMENT REGARDING FEDERALLY SPONSORED RESEARCH AND DEVELOPMENT

N/A

RELATED APPLICATIONS

N/A

BACKGROUND OF THE INVENTION

1. Field of the Invention

This invention relates generally to armrests, more particularly to an armrest accessory or supplementary item placed between adjacent chairs sharing a dividing section wherein the user's arm rests.

2. Discussion of the Background

Normally row seats are equipped with armrests serving dual functions such as providing comfort by means of a space to place one's arm and establishing the limits of space for the person sitting in the chair. However, said armrest for placing one's arm provides a limited space that basically is used by a single person. For example in a theater, stadium, airplane, public transportation vehicle, or anywhere else where at least two seats are sharing a small divisional section the users are limited to use the same armrests area. The limited armrest area results in users experiencing a degree of discomfort due to physical contact with the person sharing the armrest area or the feeling of invasion of personal space.

In order to avoid discomfort some companies have placed double width armrests in between seats such that both persons seated in adjacent chairs can comfortably rest upon it. However providing double width armrests does not completely avoid one person to invade the other's space. This practice also increases the total row length limiting the capacity of seats and/or reducing the seating space for passengers.

Further, in order to keep away from physical contact it is also likely for a person to lean towards one side while using a single armrest. The side to which the people will lean usually depends on the person's handedness, that is, a right-handed person will be more likely to lean to his/her right. If a right-handed person is seated to the left of a left-handed person, both individuals will be most comfortable leaning on the armrest between them. This can lead to conflict between the individuals that share the armrest, as well as discomfort.

SUMMARY OF THE INVENTION

The present invention overcomes the disadvantages of the previous armrests by providing an armrests accessory or supplementary item placed between adjacent chairs sharing a dividing section comprising a first structure, wherein said first structure includes a first arm resting section or lower part and a top part section wherein said first arm resting section and said top part combines to avoid the physical contact between armrest users.

It is an object to provide a vertically dual armrest accessory with space for the arms of two persons sitting in adjacent seats.

Another object is to provide an armrest accessory that avoids contact and/or reduces the transfer of arm motion between two persons sitting in adjacent seats.

Another object is to provide a dual armrest for two persons sitting in adjacent seats with an ergonomic and comfortable structure.

Another object is to provide a dual height armrest for individual seating arrangements.

Another object is to provide a comfortable arrangement of dual armrests to provide symmetric comfort for the person sitting in a chair situated in a row of chairs.

Yet another object is to provide an adjustable armrest with a mechanism for locking the armrest in the desired position.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying drawings which are incorporated herein constitute part of the specifications and illustrate the preferred embodiment of the invention.

DESCRIPTION OF THE PREFERRED EMBODIMENT

The present armrest accessory or supplementary item comprises a structure of resilient material with a curved cross-section that will extend throughout the length of the divisional section or area between two persons seated in a row of chairs. The curvature of the device creates two separate platforms that can be used as armrests.

Figure 1A:
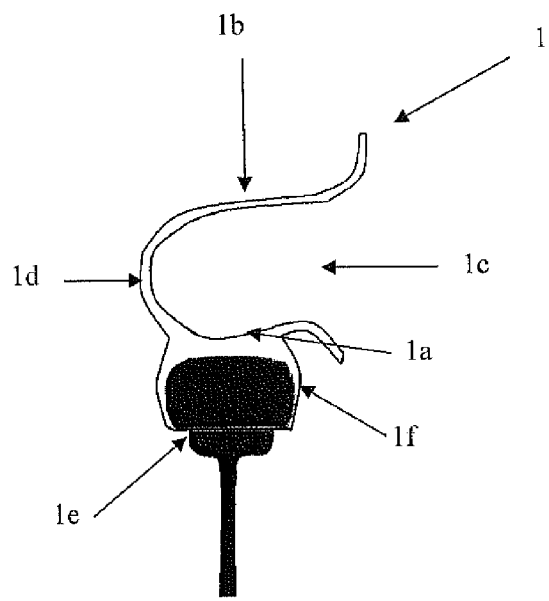
FIG. 1a is a front view of the armrest accessory mounted on an existing armrest.

The armrest accessory 1 of the present invention, as shown in FIG. 1a, comprises a C-shaped cross-section 1, comprising a lower section 1a, an upper section 1b, an open lateral side 1c and a closed lateral side 1d. The armrest accessory 1 is supported by a base 1f. The lower section 1a of the armrest accessory 1 provides a first platform for the placement of the first person's arm and the upper section 1b of the armrest accessory 1, on the exterior of the C-shape armrest accessory 1, provides a platform for a second person's arm. The open lateral side 1c of the device provides the space for inserting the arm into the lower platform, while the closed lateral side 1d represents the point of connection between the lower section 1a and upper section 1b of the armrest accessory 1, wherein said closed lateral side 1d provides support for the upper section 1b and prevents the first and second person's arms from coming into contact.

Figure 1B:
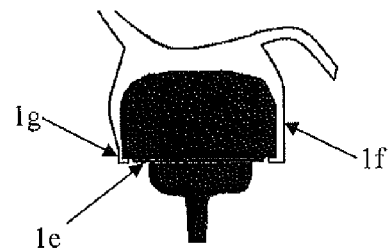
FIGS. 1b-1c are detailed views of possible fastening methods for attaching the armrest accessory to an existing armrest.
Figure 1C:
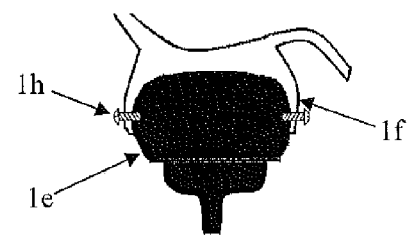

The armrest accessory 1 is fixed to an existing armrest 1e or integrally made with the armrest 1e. FIGS. 1b-1c shows two alternatives for fixing the armrest accessory 1 onto an existing armrest 1e. The base 1f of the armrest accessory 1 includes attaching means 1f, 1h for fixing said armrest accessory 1 to a existing armrest 1e. Several fixing means such as glue, screws, nails and magnetic clamping are used for fixing both parts. In FIG. 1b, the armrest accessory 1 extends across the sides of the armrest 1e and comprises lips 1g that extend below the armrest 1e. The device can be slid across the length of the armrest 1e or snapped into position. FIG. 1c shows an alternative option, where the base is fastened onto the armrest using screws 1h. Alternatively, armrests 1e can be manufactured to incorporate the device. It must be understood that any other suitable fastening method is not beyond the description of the invention.

Figure 2:
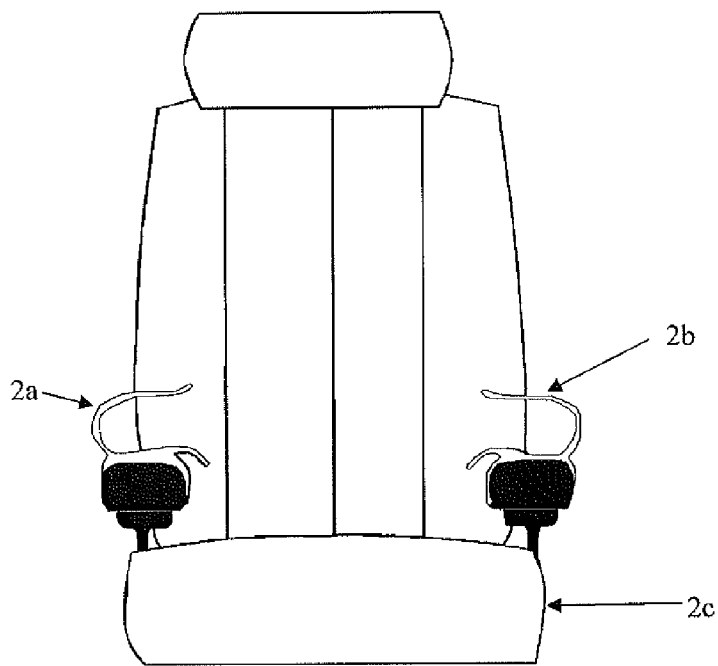
FIG. 2 is a front view of a seat equipped with the armrest accessory to both sides of the seat.
Figure 3:
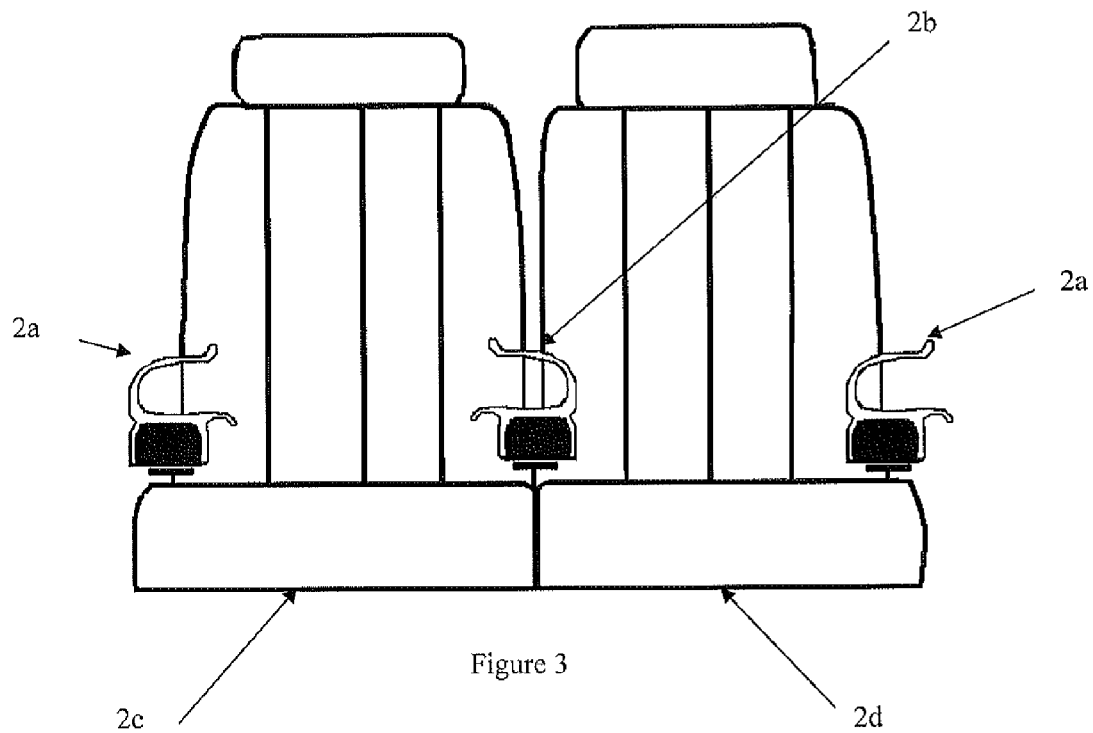
FIG. 3 is a front view of two adjacent seats equipped with the present armrest accessory and the arrangement of the device in a row of seats.

The armrest accessory 1 requires two separate configurations; one with the open lateral side 1c facing left, left-facing device 2b, and the other with the open lateral 1c side facing right, right-facing device 2a. For the first embodiment of the invention, the left and right facing devices 2a, 2b can be obtained by placing the same apparatus in an inverted position. In a row of chairs, the left and right-facing devices 2a, 2b should be alternated such that the devices to the left and right of a particular chair 2c face opposite sides. An example of the arrangement is shown in FIGS. 2 and 3. FIG. 2 shows a seat arrangement comprising a right-facing device 2a, a seat 2c and a left-facing device 2b. The armrest accessory 1 located at the right and left of the seat both face inward, however others arrangement such as outward are suitable.

FIG. 3 shows a row of two seats 2c, 2d with armrests positioned in an alternating sequence. Following the sequence the armrest placed after the second seat 2d in the row will be a right-facing device 2a. In this example, the first seat 2c has the devices 2a, 2b to the right and left facing inward, while the second seat 2d has the devices facing outward.

For example a seat 2d equipped with outward facing devices the person occupying said seats will be most comfortable placing his/her arms in the upper platform 1b of the armrest accessory 1. For seats 2c having inward facing devices the user would place his/her arms in the lower portions 1a of the device 1.

The material for the armrest accessory 1 has enough flexibility to adjust for the comfort of the user but with sufficient rigidity as to maintain the overall shape and ensure comfort for both persons using the device. The preferred material will be a resilient polymer such as high-density polyethylene (HDPE). It should be understood however, that any material that can be molded or shaped into the desired form such as polyethylene, acrylic, glass-reinforced plastic, carbon fiber, wood, aluminum and stainless steel is suitable for the invention.

Figure 4:
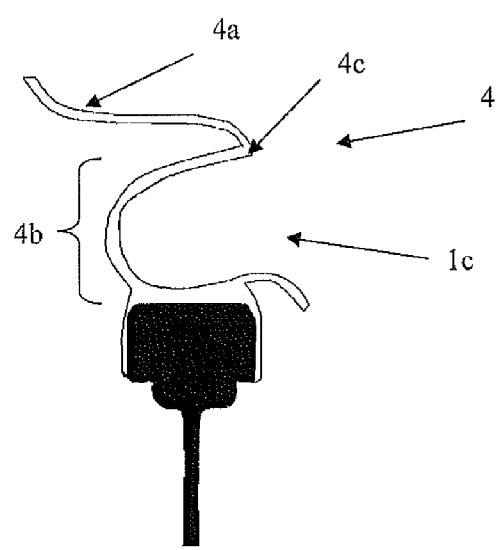
FIG. 4 is a front view of an armrest accessory including an annexed surface mounted on an existing armrest.
Figure 5:
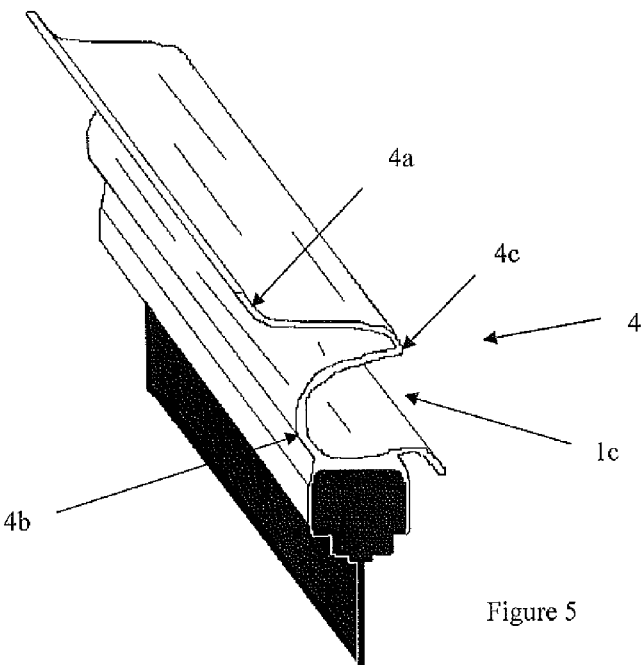
FIG. 5 is an isometric view of the armrest accessory including an annexed surface mounted on an existing armrest.

Further an armrest accessory 4 having a similar C-shaped cross-section 4b comprising a lower section 1a, an upper section 1b, an open lateral side 1c and a closed lateral side 1d, in relation with FIG. 1, incorporates an additional annex 4a for support of the arm placed above the armrest accessory 4, as shown is FIG. 4. The annex 4a connects and extends from an upper section distal end 4c of the armrest accessory 4 at the open lateral side 1c towards the closed lateral side 1d of the C-shaped cross-section 4b of the armrest accessory 4. The annex 4a extends towards the closed lateral side 1d at an angle such that the bottom of the annex 4a does not come into contact with the top of the C-shaped cross-section 4b. The connection 4c between the C-shaped cross-section 4b and the annex 4a is flexible enough as to allow a certain degree of movement of the annex 4a but sufficiently rigid as to maintain a position when no forces are applied and to prevent contact between the annex 4a and C-shaped cross-section 4b. FIG. 5 shows an isometric view of the armrest accessory 4 with a annex 4a and how armrest accessory 4 extends across the armrest body.

Figure 6:
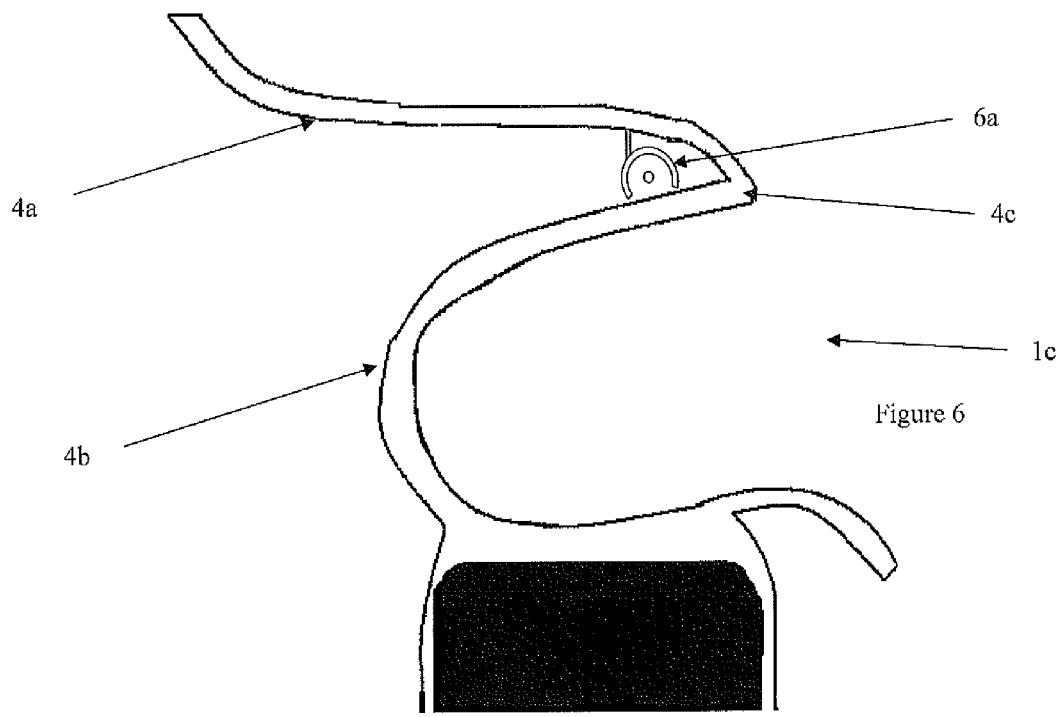
FIG. 6 shows a front view of the armrest accessory including the locking mechanism.
Figure 7:
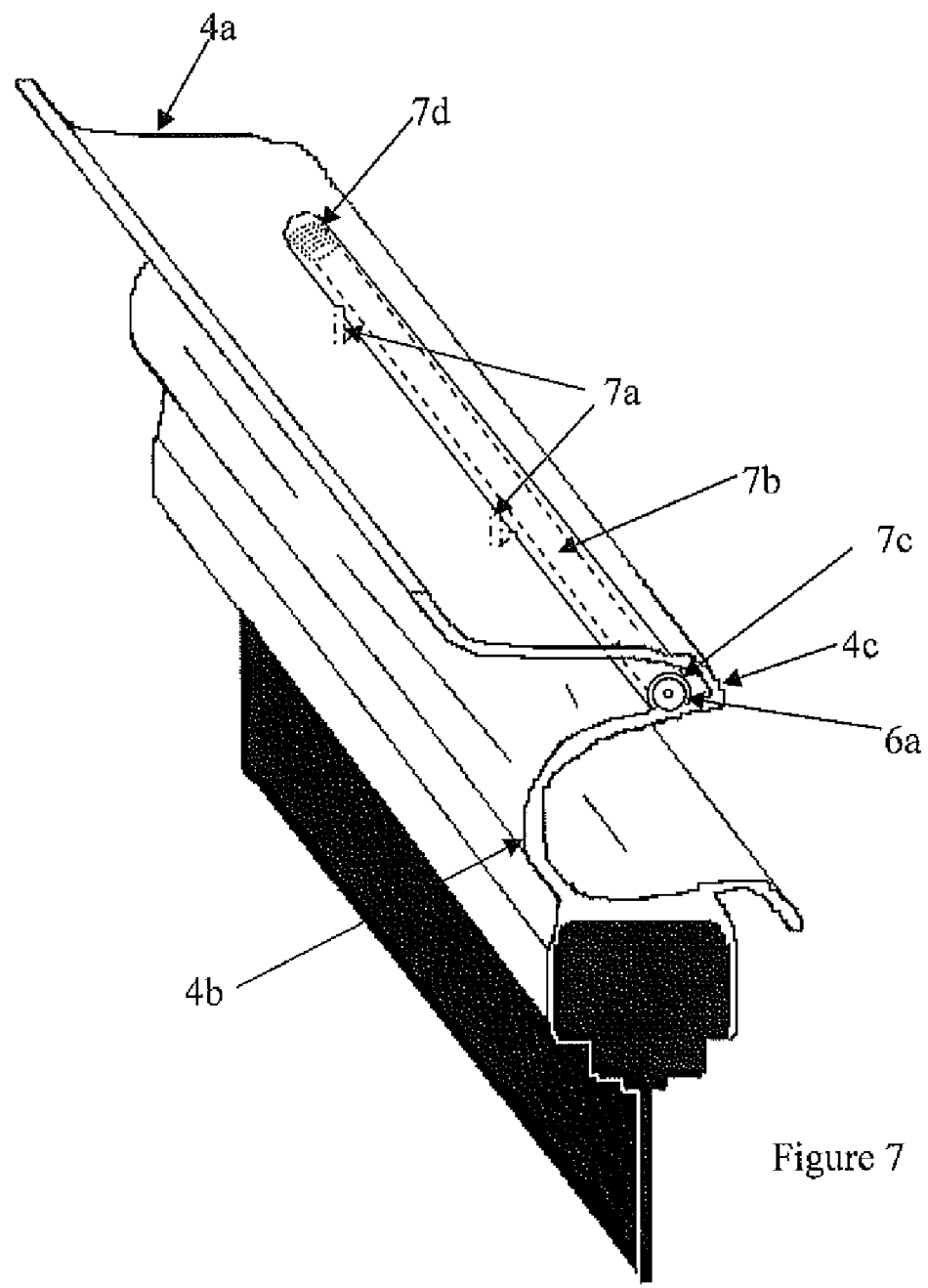
FIG. 7 is an isometric view of the armrest accessory with the locking mechanism.

FIG. 6 and FIG. 7 show the armrest accessory 4 including a locking mechanism 6a to lock said annex 4a in a predetermined angle between the annex 4a and the C-shaped portion 4b. The locking mechanism 6a, 7a comprises a cling to mechanism 6a and a fastener mechanism 7a. The fastener mechanism 7a comprises several protrusions 7a having a hook shape and are mechanically connected below the annex 4a. The cling to mechanism 6a connected is located at the upper section of C-shaped portion 4b and comprises a rod 7b inserted below a cover 7c, wherein said rod 7b comprises grooves to restrict the rod's movement and rotation and teeth within the circumference to lock with the hook or protrusions 7a, and a spring 7d located at a distal end of said rod 7b. For this embodiment of the invention, the left and right-facing devices 2a, 2b must be manufactured individually.

Figure 8:
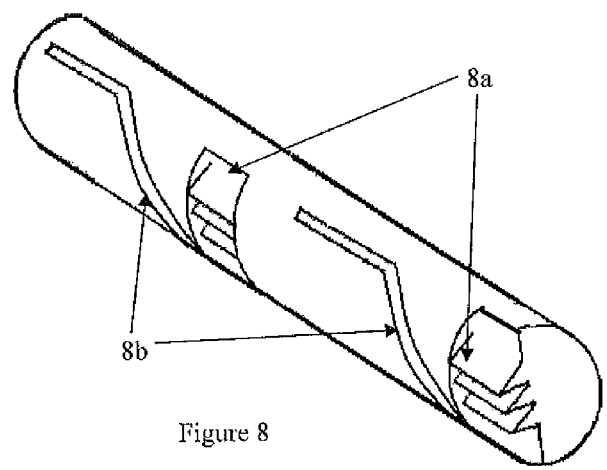
FIG. 8 is an isometric view of the rod.

FIG. 8 shows an isometric view of the rod 7b. The rod 7b comprises a cylindrical body with a plurality of sets of teeth 8a and a plurality of grooves 8b. Each set of teeth 8a is entrenched into one side of the rod 7b. At the location of the teeth 8a the circular cross-section of the rod 7b is interrupted. An arc is removed from the cross-section and the teeth 8a are embedded onto a flat surface at one side of the rod 7b. The area of the teeth 8a does not extend beyond the area covered by the circular cross-section of the rod 7b.

The grooves 8b comprise incised channels on the circumference of the rod 7b. The grooves 8a will extend along the length of the rod 7b and around the circumference simultaneously, creating diagonal lines along the length of the rod 7b.

For a right-facing device 2a the teeth 8a will be attached to a vertical surface facing left on the rod 7b. The starting point of the grooves 8b will be on top of the rod 7b moving towards the front of the device, that is, the front of the chair, and in a counter-clockwise motion. A mirror-image configuration will be necessary for left-facing devices 2b.

Figure 9A:
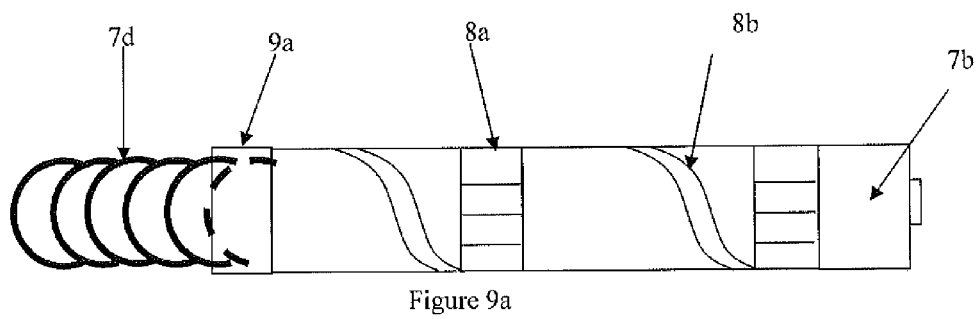
FIG. 9a-b are left and right views, respectively, of a rod for a right-facing device.
Figure 9B:
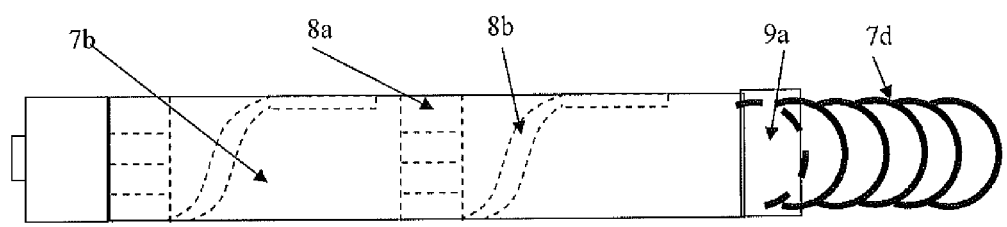

FIGS. 9a-9b show left and right side views, respectively of a rod 7b for a right-facing device 2a. The back end of the rod 7b has a hollow portion 9a wherein the spring 9b is fitted. The hollow portion 9a limits the movement of the spring 9b with respect to the longitudinal axis of the rod 7b.

Figure 10:
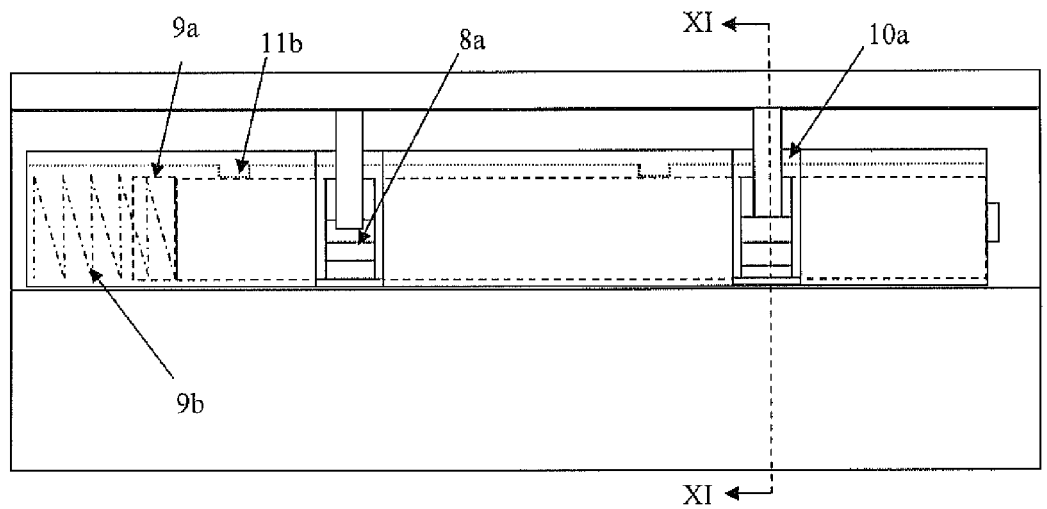
FIG. 10 is a side view of the locking mechanism.
Figure 11:
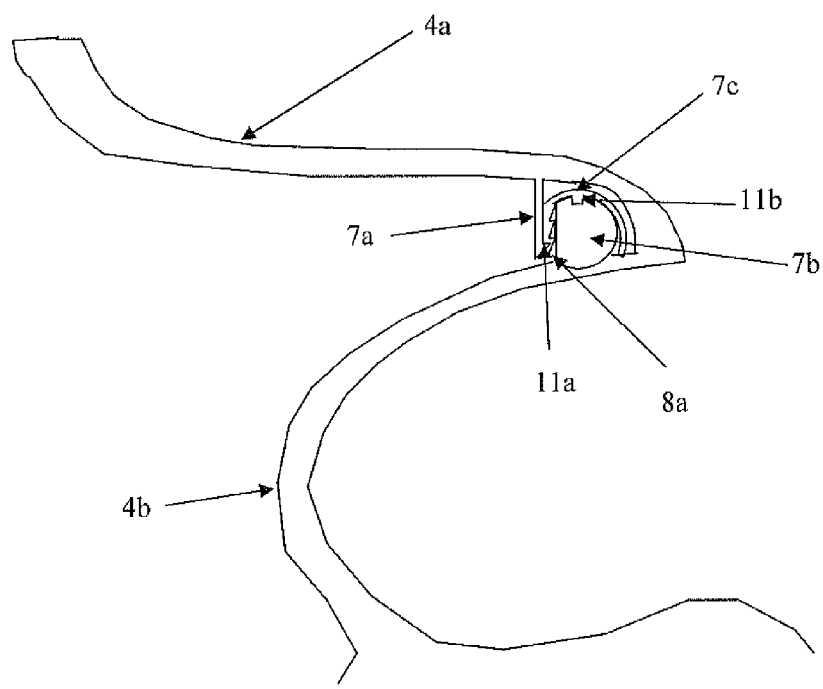
FIG. 11 is a detailed front view of the device with the locking mechanism.
Figure 12:
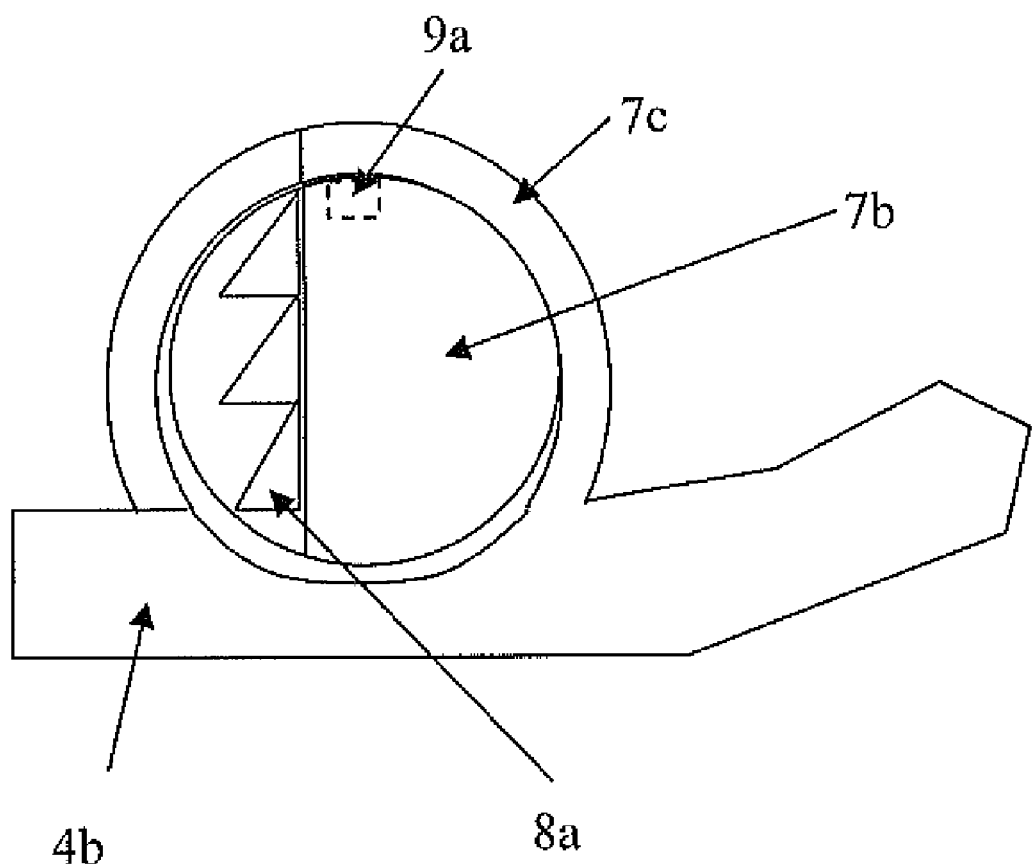
FIG. 12 is a detailed view of the rod inserted below the cover.

FIG. 10 shows a side view of the rod 7b mounted on the assembly. The cover 7c comprises a hollow cylinder with an opening and is attached to the C-shaped portion 4b upper section serving as the rod 7b housing by extending over the rod 7b. The cover 7c is equipped with a plurality of notches 11b. The notches 11b are small projections of material with rectangular cross-section that extend from the inner surface of the cover 7c directly above the rod, when inserted. The number of notches 11b must be equal to the number of grooves 8b on the rod 7b. The distance between the notches 11b on the cover 7c must be equal to the distance between the starting points of the grooves 8b. The cover also comprises a plurality of gaps 10a that enables the protrusions or hooks 7a to come into contact with the rod 7b.

The protrusions 7a attached to the annex 4a extend vertically downward and comprises at least one tooth or hook 11a facing the connection 4c between the annex 4a and the C-shaped portion 4b. The longitudinal location of the protrusions 7a coincides with the longitudinal location of the sets of teeth 8a on the rod 7b, and with the gaps 10a on the cover 7c. In a right-facing device 2a, the protrusions 7a will be located to the left of the rod 7b, at a close distance such that the teeth 8a, 11a come into contact with each other.

The gaps 10a on the cover 7c are discontinuities in the cover 7c. The cross-sectional area of the cover 7c comprises two concentric circular shapes. At the location of the gaps 10a, the cross-sectional area will comprise two concentric semi-circles. In a right-facing device 2a the open area forming the gaps 10a will face left. The gaps 10a must be adequately sized and positioned to allow for appropriate contact between the protrusions 7a and the rod 7b.

In a right-facing device 2a the cover 7c is attached to the connection 4c of the annex 4a and the C-shaped portion 4b slightly to the right of protrusion 7a. The rod 7b is inserted into the cover 7c with the teeth 8a facing left.

The notches 11b will fit within the grooves 8b. In the normal position, the spring 9b, which contact one of the distal end of the cover 7c, applies force or pushes the rod 7b towards the front of armrest. The notches 11b come in contact with the furthest end (starting point) of the grooves 8b, preventing the rod 7b from moving further forward.

Further when the front end of the rod 7b is pushed towards the spring, the rod moves towards the back compressing the spring 9b wherein said rod 7b movement is restricted by the notches 11b within the grooves 8b. In a right-facing device, the rod 7b rotates in a clockwise direction as it is pushed back.

The locking mechanism 6a is engaged by applying a downward force on the annex 4a. Basically when the protrusions 7a, more particularly the hooks 11a are pushed downward toward each hook 11a contact and engages a particular set of teeth 8a locking the annex 4a in a particular position and avoiding it to return to the original position. Further the locking mechanism 6a is disengaged by pushing the rod 7b. The pushing action and grooves 8b design assists the rod 7b to provide a rotational motion moving the teeth 8a away from the hooks 11a resulting in the disengagement of the locking mechanism 6a, 7a. The annex 4a is released into its original free position.

While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patentable distinguish any amended claims from any applied prior art.

The invention claimed is:

1. An armrest supplemental device, comprising:
a first structure,
wherein said first structure comprises an upper section having a first body with two distal ends and a lower section having a second body with two distal ends,
wherein at least one of said distal ends of said upper section an upper section's distal end is mechanically connected to at least one of said distal ends of said lower section, a lower section's distal end wherein said mechanical connection between said upper section distal end and said lower section distal end and said space between first body and second body forms a concave shape and wherein a space is created between said first body and said second body,
a locking mechanism placed between said upper section and said annex, wherein said locking mechanism comprises a cling to mechanism connected to the upper section and a fastener mechanism mechanically connected to said annex, wherein said cling to mechanism comprises a hollow cover attached to said top section, wherein said cover comprises at least a gap and several notches, a rod that is surrounded by said cover, wherein said rod comprises the rod's main body with two distal ends, wherein said rod's body comprises teeth sections and grooves and a spring connected to a distal end of the rod; and an attaching portion comprising attaching means, wherein said attaching portion is physically connected to said first structure.

2. An armrest supplemental device as in claim 1, wherein said mechanical connection between said upper section distal end and said lower section distal end and said space between first body and second body forms a concave shape.

3. An armrest supplemental device as in claim 1, wherein said attaching portion comprises a clamping surface as the attaching mean.

4. An armrest supplemental device as in claim 1, wherein said attaching means is selected from glue, screws, nails and magnetic clamping.

5. An armrest supplemental device as in claim 1, wherein one of the annex distal ends is mechanically connected to said upper section distal end.

6. An armrest supplemental device as in claim 5, wherein said connection between said annex's distal end and said upper section distal end comprises a flexible material.

7. An armrest supplemental device as in claim 1, further comprising a hollow spring cover surrounding a portion of the spring.

8. An armrest supplemental device as in claim 7, wherein said fastener mechanism mechanically connected to said annex, further comprises several protrusion having hook shapes facing the cling to mechanism.

* * * * *